United States Patent [19]

Muller et al.

[11] 3,937,893

[45] Feb. 10, 1976

[54] AUTOMATIC TELEPHONE ANSWERING DEVICE

[75] Inventors: Willy Muller, Zollikon; Markus Moser, Egg, both of Switzerland

[73] Assignee: Willy Muller, Zollikon, Switzerland

[22] Filed: July 24, 1973

[21] Appl. No.: 382,067

[30] Foreign Application Priority Data
July 31, 1972 Switzerland............... 11353/72

[52] U.S. Cl............................................. 179/6 R
[51] Int. Cl.².................. H04M 1/64; G11B 23/04
[58] Field of Search................. 179/6 R, 6 E, 6 AC

[56] References Cited
UNITED STATES PATENTS

| | | | |
|---|---|---|---|
| 2,793,252 | 5/1957 | Augustadt et al. | 179/6 R |
| 3,226,478 | 12/1965 | Martin et al. | 179/6 R |
| 3,250,856 | 5/1966 | Muller | 179/6 R |
| 3,337,690 | 8/1967 | Martin | 179/6 R |
| 3,467,781 | 9/1969 | Feat | 179/6 E |
| 3,590,160 | 5/1971 | Meri | 179/6 R |
| 3,713,039 | 1/1973 | Hashimoto | 179/6 R |
| 3,715,506 | 2/1973 | Haag et al. | 179/6 E |
| 3,721,765 | 3/1973 | Ho | 179/6 R |

Primary Examiner—Vincent P. Canney
Attorney, Agent, or Firm—J. Gibson Semmes

[57] ABSTRACT

The invention concerns a device for automatically answering telephone calls, comprising an answering system, with a first magnetic sound recorder for recording and reproducing an answering text and a mechanical driving gear for the first magnetic sound recorder, with a storage system, which comprises a second magnetic sound recorder for recording and playing back the incoming message and a mechanical driving gear for a second magnetic sound recorder, with an action control switch and additional switches for selecting specific functions, with an electrical switching, amplifying and control system for an independent control of the work cycle of the device in its different functions, said control system comprising a mechanism for recording at least a marking signal on the first sound recorder and for the play-back of the recorded marking signal in order to switch the device from its operating condition of playing back the call answering text, to the operating condition of recording the incoming information or in case of a premature ending of the play-back of the call answering text.

17 Claims, 10 Drawing Figures

AUTOMATIC TELEPHONE ANSWERING DEVICE

BACKGROUND OF THE INVENTION

Known types of such devices comprise a great number of electrically, mechanically or electromagnetically operated contacts, for instance a great number of relays, an action control switch with a complicated contact arrangement. Such contacts not only have the disadvantage of often suffering from disturbances which are difficult to locate, but it is also difficult and expensive to survey the numerous mutual interdependence of the different circuits, parts and controls in such a manner as to prevent a faulty operation of the device. The possibility of a faulty service and the occurence of a faulty operation of the device should be avoided due to the strict regulations imposed by the regulatory Communications Agency.

It is the aim of the present invention to considerably decrease in the above named device the number of mechanical, electro-mechanical or electro-magnetic switch elements and to establish a practically unlimited number of circuit connections in order to prevent any faulty operation.

SUMMARY OF THE INVENTION

According to the invention this device is characterized by the fact that the action control switch, and the other switches as well as a call detector, which detects a call, a voice detector, which detects an incoming message and a marking detector, which detects a marking signal on the first magnetic sound recorder, are constructed in order to deliver binary information signals. There is also a digital control system, the inputs of which are linked with the action control switch, the additional switches and the outputs of said detectors, the outputs of which are connected with control inputs of the electrical switch elements, whereby the digital control system depending on its internal condition and on the binary information signals, produces binary control signals for the electrical switching devices that are themselves to be controlled.

DESCRIPTION OF THE DRAWINGS

The examples of operation of the invention are explained hereafter, based on the drawings, wherein:

FIG. 2 shows a circuit diagram of a sound signal circuit;

FIG. 3 a signal lamps circuit;

FIG. 4 a relays circuit;

FIG. 5 a driving gears circuit;

FIG. 6 a switching relays circuit;

FIG. 7 an action control switch circuit;

FIG. 8 timing switches circuit;

FIG. 9 a digital control system connection schematic; and

DESCRIPTION OF THE PREFERRED EMBODIMENTS

Figure 1:
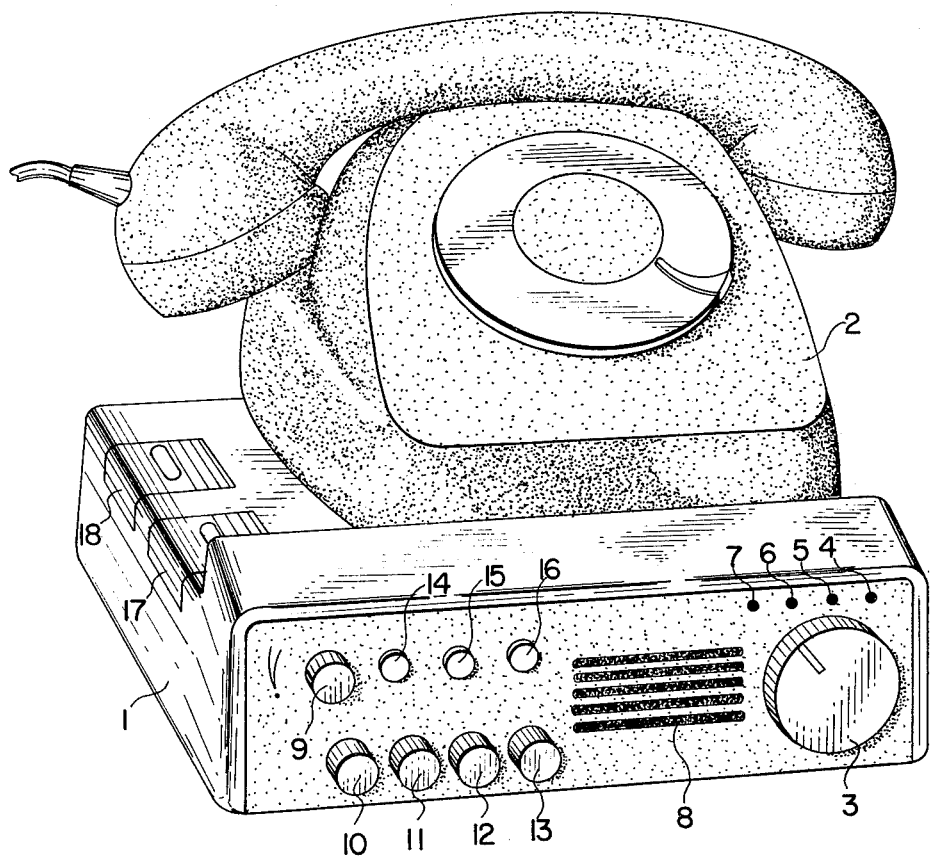
FIG. 1 is a perspective view of the device.

The perspective view of the apparatus shown in FIG. 1 illustrates a casing 1, the upper part of which serves as a low mounting surface for a telephone 2. The front of the device, which is somewhat higher in order to prevent sliding off of the telephone when it is being used, has various operating knobs and indicators. Action control switch 3 relates to four switch positions, namely a first position 4, in which the apparatus is connected with the telephone line in order to automatically answer calls by means of a first sound recorder and to record on a second sound recorder the message coming in through the telephone line. It further shows a position 5, in which this recorded message can be monitored. There is also a position 6, where the announcing text, which is transmitted onto the telephone line can be monitored for checking purposes. Lastly, there is a position 7 where the announcement text can be recorded onto the first sound recorder. To listen to the information which has come in and which has been recorded on the second sound recorder (switch position 5) and to the announcement text recorded on the first sound recorder (switch position 6) there is a loud speaker 8, whereby the volume of the playback can be regulated through volume regulator 9, which is combined with a master switch for switching the apparatus on or off.

The device has also four push-buttons 10, 11, 12 and 13. The first push-button 10 represents a start button which serves to turn on the advance of both said sound recorders and when recording the announcement text to record sound signals on the sound recorder of the announcement texts, which will be described further in greater detail. The second push-button 11 is a stop button, which serves to interrupt the advance of the sound recorder, which has recorded the messages fed into it, at the time of the playback of said messages or when rewinding the sound recorder into its starting position. The third push-button 12 is a rewind button. When it is activated, the sound recorder onto which messages have been recorded, is wound back into its starting position. The fourth push-button 13 is an erasing button. When it is activated simultaneously with the rewind button 12, when rewinding the sound recorder of the messages received, the recorded test is erased.

There are also three signal lamps 14, 15 and 16. The first, which for example may be a yellow lamp 14, lights when the device is ready for use. The second, for example a red lamp 15 lights when at least one incoming message has been recorded on the corresponding sound recorder, so that at all times one can see if during the absence of the device user at least one call with a spoken message has been received and recorded by the device. When monitoring the recorded message (position 5 of switch 3) lamp 15 turns off. The third, for example a green lamp 16 lights up, when switch 3 is in the first position 4, that is to say when the device is connected with the telephone circuit in order to receive calls.

The present device also includes on a side wall, not shown on FIG. 1 a jack for plugging in a microphone in order to record the announcement text on the corresponding sound recorder. In a known manner, the microphone may be provided with a switch, with which the advance of the announcement sound recorder can be turned on or off.

The present device can be connected at its back with the telephone line, and with the telephone 2.

As a sound recorder for the announcement text and the incoming messages the present device has cassettes with wound up magnetic tapes. Both cassettes can be put in or taken out of chassis 1 by opening flaps 17 and 18. The cassettes which are most appropriate, are those utilized for dictating devices. These cassettes are quite compact and have a recording and play-back time of around 15 minutes. In the present case the sound recorder for the announcement text will be designated with an announcement tape and the sound recorder for the incoming messages with a storage tape. Each one of these two sound recorders are of course provided with a corresponding recording, play-back and erasing head and with a gear for advancing and rewinding the sound recorder. But instead of a recording tape it can also have another sound recorder, for instance a magnetic sound foil.

Figure 2:
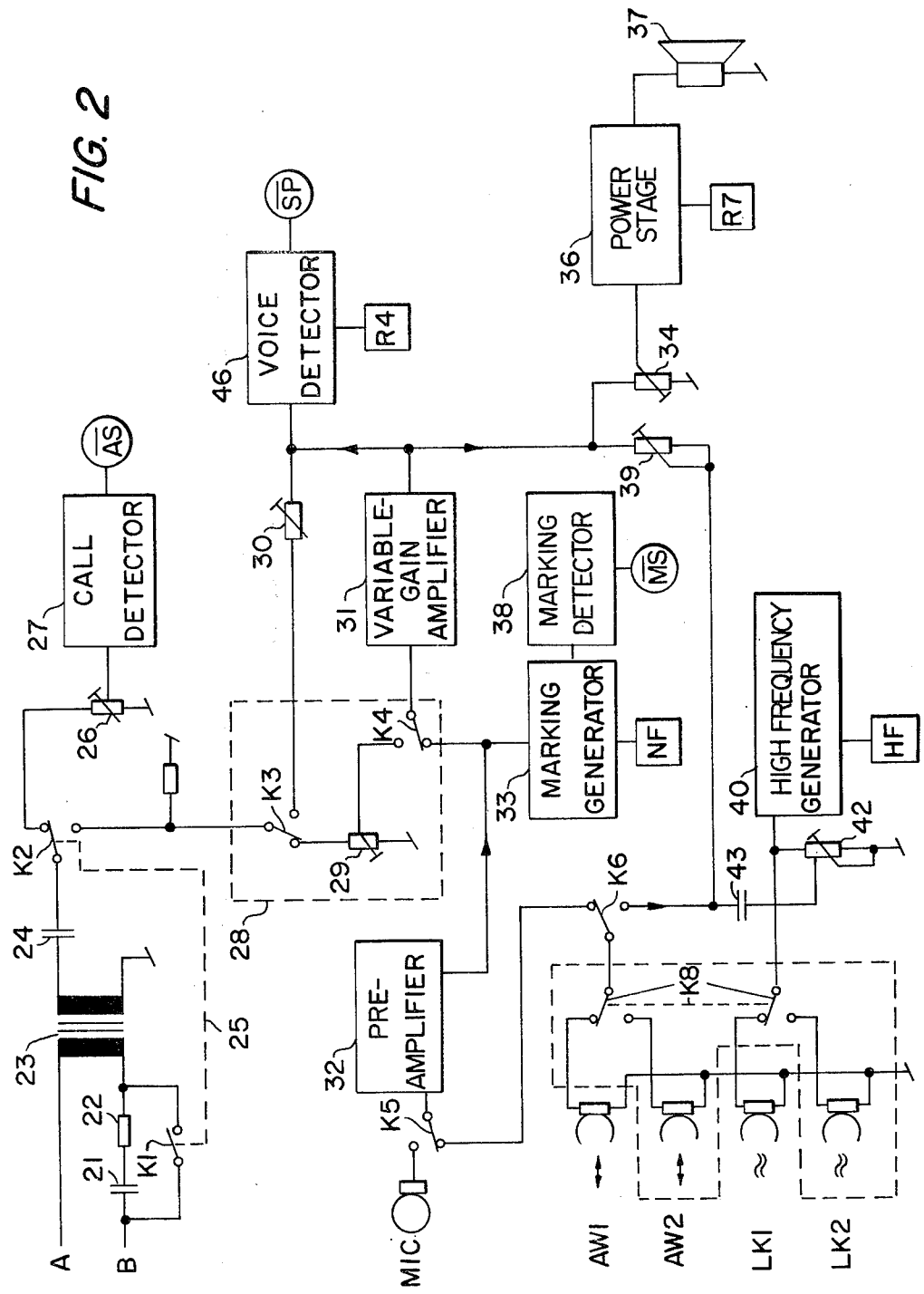
FIG. 2 to FIG. 9 depict the individual circuits of the device, which are the following.
Figure 7:
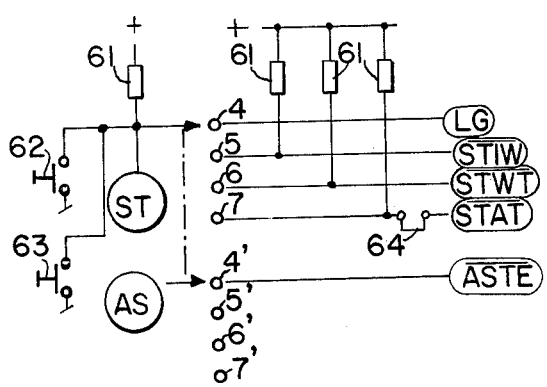
Figure 8:
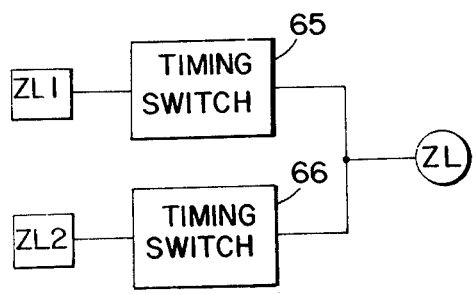
Figure 9:
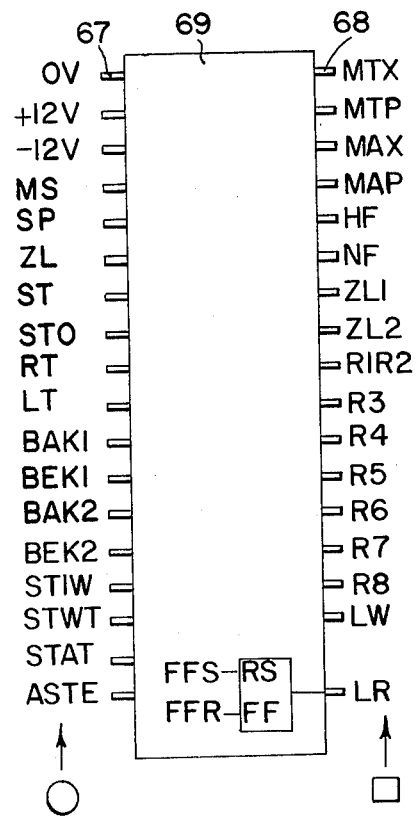

In FIGS. 2 to 9 circuits of the present device are shown individually. FIG. 2 for instance shows the particular circuit of the device, which refers to sound signals, whereby FIG. 3 to 8 show circuits with binary circuit functions. the present device is based on the fact that in the circuit arrangement there are on the one hand, signals, or signals may be produced, which have the meaning of input variables and on the other hand such signals, which represent output or control variables, whereby in both cases the signals are binary signals, that is to say from two levels they either have a higher or a lower one. The function of the signals are shown in the figures by means of abreviated designations, whereby the designations for the input variables are to be found in round boxes and those for the control variables in square boxes. Signal designations without a transverse bar indicate the higher level, and those with a transverse bar, indicate the lower level. The input variables and the control variables are linked together through a logical digital control system, which is preferably set up as integrated circuits and is shown in FIG. 9.

Figure 4:
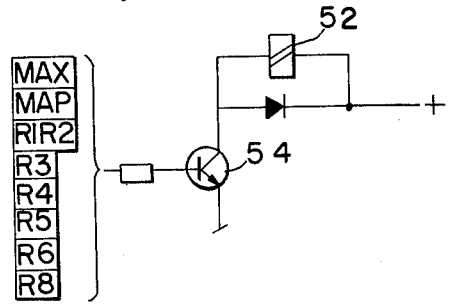

According to FIG. 2 there is a telephone line A, B on an alternating current over a condenser 21 and a resistance 22 connected in series to it, on one of the coils of a line transfer 23. For the galvanic connection of the telephone line A, B with the transformer 23 there is a relay contact K1, the relay of which together with the control circuit is shown in FIG. 4 and is described hereinafter. On the other coil of the transformer 23 over a condenser 24 there is an additional relay contact K2, which acts as a changeover contact, the relay of which together with its corresponding relay with control circuit is also shown in FIG. 4. The relay with contacts K1 and K2 are activated through the same control voltage so that the switch motion of contacts K1 and K2 occurs simultaneously, which is shown by a dotted line 25. In the resting position contact K2 connects the other coil of the transformer 23 with a potentiometer 26, the wiper of which is is connected to the input of a call detector 27. The conventional call detector 27 has a differentiating circuit in order to attain narrow impulses, which are independent of the amplitude of the calling sound reaching its input by going over the transformer 23 and contact K2, to which are connected a rectifier and an integrating circuit. In order to set the response time of the detector the integrating circuit advantageously shows a timing constant, for instance an adjustable resistance. The output signal AS (calling signal) of the call detector 27 which serves as one of the input variables goes to the lower transmission level, when the detector detects a call.

In the other operating position of relay contact K2 there is to be found the other coil of the transformer 23 connected with a throw-over switch 28, which comprises two relay contacts K3 and K4, which act as change-over contacts, as well as a potentiometer 29. In the operative position of contact K3 there is a transformer 23 and with it telephone line A, B are connected over an adjustable resistance 30 with the output of the variable-gain amplifier 31, so that the input signal of variable-gain amplifier 31 from contact K4 which is in a resting position reaches in an amplified manner the telephone line. In the resting position of contact K3 and in the working position of contact K4 is to be found the telephone line A, B over the transformer 23 and the wiper of potentiometer 29 at the input of the variable-gain amplifier 31, so that a sound signal coming over the telephone line, particularly a voice signal, is amplified in the variable-gain amplifier 31. The relays belonging to contacts K3 and K4 are shown together with their master oscillators in FIG. 4, this being explained hereinafter in greater detail. The adjustable resistance 30 and the potentiometer 29 serve to set the transmission level of the output signals transmitted to the telephone line, or the input signals from the variable-gain amplifier received through the telephone line.

The variable-gain amplifier is provided for instance at the input with an adjustable attenuator (not shown), coupled with an amplifier at the output. A fixed portion of the output voltage of the amplifier is rectified and is led to the attenuator as a direct-current control voltage, whereby a voltage divider is provided in order to produce the fixed portion of said output voltage. With this circuit arrangement a range of adjustment of for instance + 13 dB . . . − 50 dB can be obtained. Said voltage divider is adjusted for instance in such a manner that the output voltage would be within the range of regulation of 4 V-rms (12 V from peak to peak).

In the rest position of contact K4 the input of the variable-gain amplifier 31 is connected with the output of a preamplifier 32, said output being further connected with the input of a marking generator 33. At the input of the preamplifier 32 there is an additional relay contact K5 connected which acts as a change-over contact, the relay of which is shown in FIG. 4. In the operative position of contact K5 the input of the preamplifier 32 is connected with microphone MIC. In this contact position the voice voltages of microphone MIC go through preamplifier 32 to reach the input of the variable-gain amplifier 31.

In the indicated resting position of contact K5 (FIG. 2), the input of the preamplifier 32, by going through relay contacts K6 and K8, is connected selectively with a series of sound heads, for the announcement tape and the storage tape. This arrangement comprises a combined recording and play-back head AW1 for the announcement tape and a combined recording and play-back head AW2 for the storage tape. These sound heads are provided with an erasing head LK1 for the announcement tape and with an erasing head LK2 for the storage tape, separated through switching, whereby the heads for the announcement tape are shown outside and those for the storage tape inside of a dashed frame.

In the indicated resting position of contact K6, which acts as a change-over contact, the relays of which are again shown in FIG. 4, are to be found according to the position of contact K8 which also acts as a change-over contact (corresponding relay, see FIG. 4) at the input of preamplifier 32 either the recording or replay head AW1 of the announcement tape or the corresponding head AW2 of the storage tape. The signal captured by one of these sound heads and thereafter amplified reaches the input of the variable-gain amplifier 31 and the input of the marking generator 33. To the output of the variable-gain amplifier 31 is also connected, some other switching parts which will be discussed in detail hereafter, a potentiometer 34 which acts as volume control, the wiper of which is at the input of an output stage 36. A loudspeaker 37 is connected onto the output of a power stage 36. Volume control 34 and loudspeaker 37 have already been mentioned when describing FIG. 1.

Again, in the indicated resting position of relay contacts K6 and K8, the announcing text recorded on the announcing tape can be monitored for control purposes on the loudspeaker 37, whereby the action control switch 3 of FIG. 1 has to be brought into position 6, or this announcement text can be transmitted onto the telephone line A, B in order to answer a call, whereby said action control switch has to be put into position 4. In the working position of relay contact K8, the messages which have been received and which have been recorded on the storage tape may be monitored in loudspeaker 37.

Before explaining the importance of marking generator 33 and of marking detector 38 which is connected to it for the play-back of the announcement text and its transmission onto the telephone line, one must explain the circuit elements which are involved when recording the announcement text onto the announcement tape. The present device has been developed in such manner that when recording the announcement text, which generally consists of a first portion with a request to the calling party to start speaking, and of a second portion with the final cancellation, there is after the first portion and after the second portion of the announcement text a sound marking recorded onto the announcement tape, which when transmitting the announcement text to the telephone line serves as a control signal which triggers the control functions in the device.

When recording the announcement text, the microphone MIC is connected over contact K5 with the input of the preamplifier 32. The preamplifier voice signal reaches over contact K4 to the input of the variable-gain amplifier 31. From the output of the variable-gain amplifier 31 the voice signal which has been amplified onto a uniform level travels through an adjustable resistance 39 to the relay contact K6, which feeds the voice signal in its working position and in the indicated resting position of contact K8 to the combined recording and play back head AW1 for the announcement tape. Furthermore a high-frequency generator 40 is provided, which by means of a control variable HF, is lead into an oscillating condition. The complete output voltage of the high-frequency generator 40 is fed in a known manner through a second contact K8 to the erasing head LK1 of the announcement tape for erasing the previous announcement text. A high frequency component voltage received at the pick-up of a potentiometer 42 is also fed in a known manner through a condenser 43 to the voice signal for a high-frequency magnetization of the announcement tape.

The marking generator 33 includes in the present example an active filter circuit, whereby the feedback coupling branch is controlled by a control variable NF, so that in the event of a control variable NF the active filter control circuit oscillates with its proper frequency of 180 to 200 Hz, but if the control variable NF is missing it forms a selective amplifier for said frequency. When recording the announcement text and when there are control variables NF the circuit of the marking generator 33 connected with the output circuit of the preamplifier 32 constitutes its output circuit. The marking generator is of such a manner, that the said marking signal with a frequency of 180 to 200 Hz has approximately the same level as the output signal of the preamplifier 32 when talking normally into the microphone MIC, so that essentially no undesirable, time consuming changes of the control point in the control amplifier 38 may occur. The control variables NF are produced when activating the starting button 10 (FIG. 1) on the device or a corresponding starting switch on the microphone after finishing the recording of the first or the second part of the announcement text, as explained herein.

To prevent, when recording the announcement text, the voice signal from reaching the output stage 36 or the loudspeaker 37, the output stage contains a holding circuit, which is controlled by a control variable R7 in such a manner, whereby as a control variable R7 may occur, the output stage 36 is opened.

It has already been explained that when reproducing the text of the announcement tape, to transmit the announcement text to the telephone circuit, contacts K8, K6 and K4 are in rest position and contacts K3 and K2 are in their working position, so that a complete signal path exists from the sound head AW1 through the preamplifier 32, the variable-gain amplifier 31 and the adjustable resistance 30 to the transformer 23. The output signal of the preamplifier also reaches the marking generator 33, whereby in the present operating manner (action control switch 3 of FIG. 1 in position 4, that is to say "telephone") the control variable NF for the marking generator 33 is missing, so that the latter acts as a selective amplifier. Since the signal reproduced by the announcement tape, with its fixed frequency within the said frequency range from 180 to 200 Hz, contains mainly the previously recorded marking signal, only this is amplified in the marking generator 33. The marking detector connected to the marking generator detects the occurrence of such a marking signal and tranforms it into a digital output signal MS, which has the low level mentioned before when a marking signal has been detected. This output signal serves in a manner described later on as input variable for the digital control system.

When recording an incoming message, the corresponding voice signal goes through contacts K2, K3 and K4 to the input of variable-gain amplifier 31 and from its output over an adjustable resistance 39 and contact K6 to contact K8, which is now in its working position, so that the amplified voice signal is fed to the combined recording and replay head AW2 of the storage tape. Due to the existence of control variables HF, high-frequency generator 40 oscillates. Its full output signal erases the previous recording by means of an erasing head LK2, while a high-frequency partial voltage as a magnetizing current is fed through condenser 43 together with the voice signal to the sound head AW2.

The output of the variable-gain amplifier 31 has also a voice detector 46 connected to it, which when a voice signal reaches its input, produces a corresponding input variable SP for the digital control system, and which holds this variable during a certain time period when the voice signal is temporarily missing. Furthermore the voice detector responds only to variations of amplitude, and does not respond to the dial tone.

For this purpose the voice detector 46 may have on its input a highpass filter with a cutoff frequency of around 600 Hz, so that the interrupted dial tone is eliminated. The voice detector can also be developed in such a manner that it connects signals which otherwise are of variable amplitude, but interrupts a continuous sound of a given frequency after approximately 5 seconds. Preferably the voice detector contains a differentiating circuit part, which detects fluctuating amplitudes, as well as a storage condenser, which is charged and discharged with a sineshaped signal, so that the output signal $\overline{SP}$ does not occur. The voice detector preferably contains a timing circuit, for instance an RC-circuit, in order to obtain a delay of approximately 5 seconds in case of a sudden lack of the voice signal and thus the stopping of the output signal $\overline{SP}$ during a speaking pause of the calling person. In order to prevent the announcement text, which is located at the output of the variable-gain amplifier 31 and thus at the input of the voice detector 46, from being transmitted to the telephone line and activating the latter, the control variable R4, which activates relay contact K4 is added to the voice detector 46, where for instance by means of a transistor not shown it may short circuit the condenser of said RC-circuit.

Figure 3:
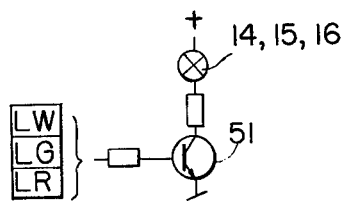

In FIGS. 3 to 8 are shown additional switching networks for the present device. FIG. 3 shows a switching network as foreseen for each of the three signal lamps 14, 15 and 16 of FIG. 1. This switching network contains a transistor 51, in the collector circuit of which the corresponding signal lamp 14, 15, 16 is connected through a series resistance. A corresponding control signal LW for the yellow lamp 14 (ready to operate), LR for the red lamp 15 (signaling that an incoming message has been recorded) and LG for the green lamp (action switch 3 on position 4 "telephone") is connected to the base of transistor 51 over a series resistance. The control signals LW and LR are thus control variables of the digital control system, while signal LG is directly provided by the action control switch (compare FIG. 7).

FIG. 4 shows the arrangement of the different relay control circuits, whereby each relay 52 is connected with the collector circuit of a transistor 54, the basis of which receives the corresponding control signal by going through a series resistance. All control signals are control variables of the digital control system, whereby the indicated designations have the following meanings: MAX represents the control signal for a solenoid which reverses the sense of rotation of the announcement tape drive (rewind). MAP has the same meaning for the sense of rotation of the storage tape drive. R1 to R6 and R8 are the control signals for the relays with contacts K1 to K6 and K8 mentioned in FIG. 1, whereby R1 and R2 represent the same control signal for two separate relays with contacts K1 or K2.

Figure 5:
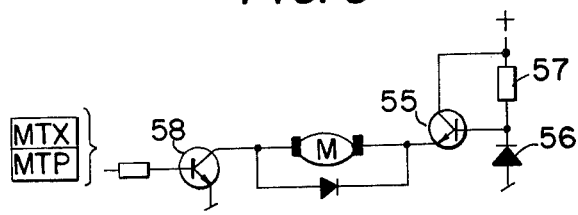

FIG. 5 shows the control circuit for the motor of the announcement mechanism, or the motor of the storage mechanism. One of the terminals of each direct current motor M is fed by a voltage of a transistor 55, of a breakdown diode, whereas the other terminal of the motor by going over a transistor 58 is grounded. A control signal on the base of the transistor 58 puts the latter into a conducting condition, so that the motor lies between the constant emitter voltage of transistor 55 and earth. MTX and MTP are control variables of the digital control system, whereby MTX represents the control signal for the motor of the announcement mechanism and MTP represents the control signal for the motor of the storage mechanism.

Figure 6:
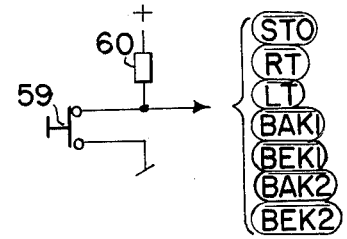

FIG. 6 shows the switching network for various mechanical switches. The closing contact 59 of each switch is therefore connected on one hand to the ground and on the other hand by going over a resistance 60 with a positive voltage, whereby the connection point of the contact with the resistance furnishes the unblocking potential, which when closing the contact falls onto the potential 0 (ground), thus receives the lower level of the digital control signals. $\overline{STO}$ represents the unblocking potential of stop button 11 (FIG. 1), RT the unblocking potential of the return button 12, LT the unblocking potential of the erasing button 13, $\overline{BAK1}$ and $\overline{BEK1}$ the unblocking potential of the contact of the beginning of the tape or end of the tape contact of the announcement tape and $\overline{BAK2}$ and $\overline{BEK2}$ corresponding to the same contacts on the storage tape.

FIG. 7 shows the circuit of the action control switch 3 of FIG. 1. This is a rotary switch with four positions and two planes. The contacts of the four positions according to FIG. 1 are designated on one plane with 4, 5, 6, 7 and on the other plane with 4', 5', 6', 7'. The moved contact element of the first plane on one hand is connected over a resistance 61 with a positive voltage and on the other hand it is connected with two parallel closing contacts 62 and 63, whereby contact 62 belongs to the start button 10 in FIG. 1 and the other to the start button of the microphone. When closing one or the other contact the voltage of the movable contact element of the first plane falls onto value 0 (ground). The voltage of the movable contact element of the first plane is provided as input variable ST for the digital control system. The voltages of contacts 4 to 7 serve as input variables for the digital control systems, with the exception of the control signal LG of contact 4, which is fed directly as control signal LG to the control circuit of the green signal lamp 16, so that this lamp lights up as soon as the device is connected. The action control switch 3 in position 4 insures connection of the device with the telephone line, position "telephone".

The remaining contacts 5 and 7 are connected through additional resistances 61 to the same positive voltage as the first mentioned resistance 61, so that this contact and the movable contact element shall have the same potential. In position 5 through activation of start button 10 (contact 62) or of the microphone switch (contact 63) an input variable $\overline{STIW}$ with voltage 0 (ground) is produced, namely the input variable "Start internal play-back". In position 6 it is the input variable $\overline{STWT}$ "Start playback of announcement text" and in position 7 it is input variable $\overline{STAT}$ "start recording of announcement text." The telephone wire going out from contact 7 carries a bridge 64, which is installed in the microphone plug, so that input variable $\overline{STAT}$ only is produced, when the microphone is actually plugged into the device.

On the second plane of the function control switch of FIG. 7, in position 4 of the action control switch (contact 4') the output signal $\overline{AS}$ of the call detector 27 of FIG. 2 is sent through and serves the input variable ASTE "call operating position telephone" for digital control system. The other contacts 5' to 7' of the second plane are empty.

And finally in FIG. 8 there is a double timing switch, also provided in the device. Control variables ZL1 and ZL2 of the digital control system are each connected with a timing switch 65 or 66, which with a determined time delay emits an output signal. The outputs of both time switches are connected together and produce an input variable ZL for the digital control system. These timing switches are meant on one hand for limiting from 33 seconds to minutes, depending on the setting, the length of time for recording a message on the storage tape and also for interrupting the recording of a message in the absence of a marking signal on the storage tape, for instance when a tape tears. Both timing control switches 65, 66 contain for instance a condenser, which with a jump from the input signal ZL1 or ZL2 is loaded over a resistance from 0 to a positive value, until the voltage of the condenser reaches the unblocking potential of a break-down diode, at which time the output potential ZL in turn jumps from 0 to a positive value. In the timing switch 65, the charging resistance can be set very advantageously in order to set the time delay.

FIG. 9 shows an enlarged example of an external form of a digital control system, which is developed as an integrated switch in chassis 69 with side connecting lugs 67 and 68. On the left side of the chassis 69 are set the connecting lugs 67 for the input variables, shown by a circle. Therefore the left side shows three connecting lugs for the supply voltage of the integrated circuit, namely 0V, + 12V and − 12V. On the right side of the chassis 69 are the connecting lugs 68 for the control variables (output variables) of the digital control system, indicated by a square.

The following table shows clearly the meaning of the different signals whereby for the input variables a signal jump from a positive voltage onto value 0 corresponds to a message and for the control variables a signal jump from 0 to a positive value corresponds to a switching function.

|      | Input variables |
|------|----------------|
| MS   | output signal of marking detector |
| SP   | output signal of voice detector |
| ZL   | output signal of timing switch |
| ST   | signal start button or microphone switch |
| STO  | signal stop button |
| RT   | signal play back button |
| LT   | signal erasing button |
| BAK1 | signal tape beginning contact of announcement tape |
| BEK1 | signal tape ending contact of announcement tape |
| BAK2 | signal tape beginning contact of storage tape |
| BEK2 | signal tape ending contact of storage tape |
| STIW | start signal of internal play-back of storage tape |
| STWT | start signal of play-back of announcement tape |
| STAT | start signal of recording of announcement tape |
| ASTE | call signal operating position of telephone |
|      | Control Variables (identification of the controlled switch part) |
| MTX  | announcement motor |
| MTP  | storage motor |
| MAX  | relay sense of rotation announcement tape advance |
| MAP  | relay sense of rotation storage tape advance |
| HF   | high-frequency generator |
| NF   | marking generator |
| ZL1  | first timing switch |

-continued

|      | Input variables |
|------|----------------|
| ZL2  | second timing switch |
| R1 R2 | relay telephone line (K1 K2) |
| R3   | relay variable-gain amplifier input/output (K3) |
| R4   | relay input variable-gain amplifier (K4) and voice detector |
| R5   | relay input pre-amplifier (K5) |
| R6   | relay recording-play-back head (K6) |
| R7   | input end stage |
| R8   | relay sound heads of announcement tape/storage tape (K8) |
| LW   | signal lamp yellow |
| LR   | signal lamp red |

As indicated in FIG. 9 the integrated circuit feeds onto both inputs of a RS-flipflop RE-FF a setting signal FFS or a resetting signal FFR. The output of RS-flipflop is connected with a connecting lug for the control variable LR, whereby the setting signal FFS gives rise to a control function of the control variables LR, that is to say that the output of RS flipflop climbs to a positive value.

The digital control system contains for instance a coding circuit for the input variables, a row of flipflops which are controlled by fixed cycle signals a fixed cycle generator, a decoding switch and a combination logic circuit, whereby a feedback of the input of the decoding circuit into the input of the coding circuit has been provided. The fixed cycle frequency is that of for instance 10 to 15 Hz, that is to say that it is low enough to avoid a contact chatter, but high enough so that the owner of the device will not notice any delay.

Figure 10:
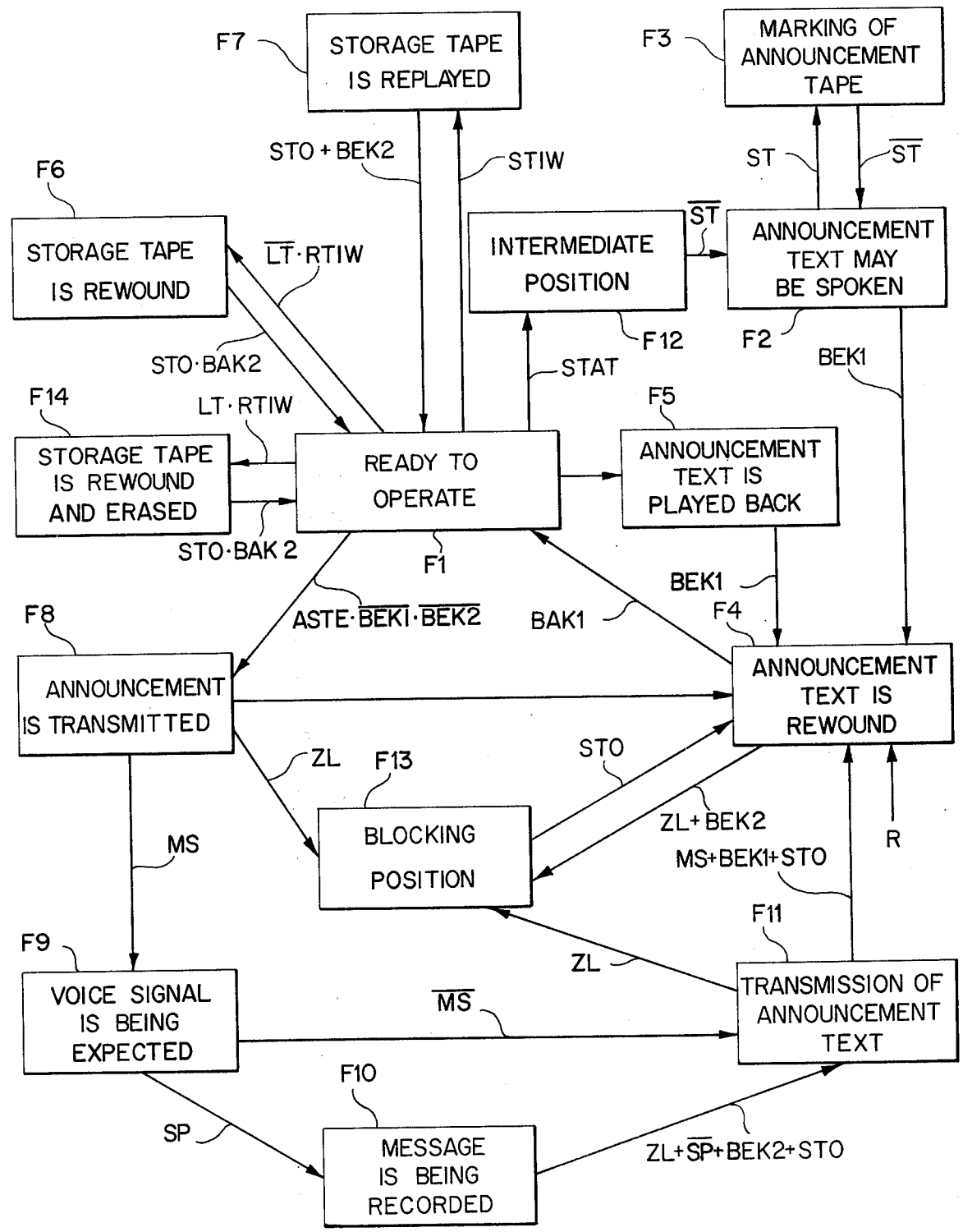
FIG. 10 a flow chart.

Based on a flow chart of the present device shown on FIG. 10 and of the combination logic circuit contained in the digital control system the operational cycle of the device for the four different methods of operation are described hereafter. That is to say the description relates to the position of the action control switch 3 in FIG. 1, taking into consideration different possible contacts.

In flow chart of FIG. 10, 14 system conditions are indicated with F1 to F14 whereby the linear shaped transitions from one system condition to another are indicated each time with signals emitted by the circuit parts or the actuators, said signals being input variables of the digital control system. In a known manner a bar on a designation means the negation (inversion), whereby in the case of several designations of a transition, a point has the meaning of "AND" and a plus sign has the meaning of "OR".

In the following table the combination logic circuit of the digital control F1 to F14 is indicated for each system condition, which in the case of control variables (output variables) of the digital control (FIG. 9) has a switching function, that is to say that it lies on the higher level or on a positive voltage. On the table this is indicated by the number "1".

TABLE

|    | MTX | MTP | MAX | MAP | HF | NF | ZL1 | ZL2 | R1R2 | R3 | R4 | R5 | R6 | R7 | R8 | FFS | FFR | LW |
|----|-----|-----|-----|-----|----|----|-----|-----|------|----|----|----|----|----|----|-----|-----|-----|
| F1 | 0 | 0 | 0 | 0 | 0 | 0 | 0 | 0 | 0 | 0 | 0 | 0 | 0 | 0 | 0 | 0 | 0 | 1 |
| F2 | 1 | 0 | 1 | 0 | 1 | 0 | 0 | 0 | 0 | 0 | 1 | 1 | 0 | 0 | 0 | 0 | 0 | 0 |
| F3 | 1 | 0 | 1 | 0 | 1 | 1 | 0 | 0 | 0 | 0 | 0 | 1 | 0 | 0 | 0 | 0 | 0 | 0 |
| F4 | 1 | 0 | 0 | 0 | 0 | 0 | 1 | 0 | 0 | 0 | 0 | 0 | 0 | 0 | 0 | 0 | 0 | 0 |
| F5 | 1 | 0 | 1 | 0 | 0 | 0 | 0 | 0 | 0 | 0 | 0 | 1 | 0 | 0 | 0 | 0 | 0 | 0 |
| F6 | 0 | 1 | 0 | 0 | 0 | 0 | 0 | 0 | 0 | 0 | 0 | 0 | 0 | 0 | 0 | 0 | 0 | 0 |
| F7 | 0 | 1 | 0 | 1 | 0 | 0 | 0 | 0 | 0 | 0 | 0 | 0 | 1 | 1 | 0 | 0 | 0 | 0 |
| F8 | 1 | 0 | 1 | 0 | 0 | 0 | 1 | 1 | 1 | 0 | 0 | 0 | 1 | 0 | 0 | 0 | 0 | 0 |

TABLE-continued

| | MTX | MTP | MAX | MAP | HF | NF | ZL1 | ZL2 | RR2 | R3 | R4 | R5 | R6 | R7 | R8 | FFS | FFR | LW |
|---|---|---|---|---|---|---|---|---|---|---|---|---|---|---|---|---|---|---|
| F9 | 1 | 0 | 1 | 0 | 0 | 0 | 0 | 0 | 1 | 0 | 1 | 0 | 0 | 0 | 0 | 0 | 0 | 0 |
| F10 | 0 | 1 | 0 | 1 | 1 | 0 | 1 | 0 | 1 | 0 | 1 | 0 | 1 | 1 | 1 | 1 | 0 | 0 |
| F11 | 1 | 0 | 1 | 0 | 0 | 0 | 0 | 1 | 1 | 1 | 0 | 0 | 0 | 1 | 0 | 0 | 0 | 0 |
| F12 | 0 | 0 | 0 | 0 | 0 | 0 | 0 | 0 | 0 | 0 | 0 | 0 | 0 | 0 | 0 | 0 | 0 | 0 |
| F13 | 0 | 0 | 0 | 0 | 0 | 0 | 0 | 0 | 0 | 0 | 0 | 0 | 0 | 0 | 0 | 0 | 0 | 0 |
| F14 | 0 | 1 | 0 | 0 | 1 | 0 | 0 | 0 | 0 | 0 | 0 | 0 | 0 | 0 | 1 | 0 | 1 | 0 |

In the flow diagram of FIG. 10, condition F1 indicates ready for operation, whereby the device is switched on and the cassettes with the announcement and recording tapes are set in place. In this condition the yellow signal light 14 is lighted (FIG. 1), which can be seen on the table, since on the first line (F1) the control variable LW is on the higher level.

Recording of the announcement text and of the markings

Action control switch 3 is set into position 7 (FIG. 1 and 7); microphone-plug is plugged into the device jack on the side.

Starting button 10 is pressed or the microphone switch is activated (closing of contact 62 or 63 in FIG. 7), whereby the input variable $\overline{STAT}$ delivers a message, whereby lamp 14 turns off and the device reaches system condition F12 as long as the start button remains depressed. See line F12 on the table with LW=O.

After releasing start button ($\overline{ST}$) the system condition reaches F2, whereby the announcement text can be recorded onto the announcement tape, see line F2 on the table, whereby control variable MTX, MAX, HF, R5, R6 have the higher level 1. Now the first part of the announcement text is being recorded.

After the speaking is finished the start button is pushed again (ST), and is kept depressed for the length of time one expects that the answer of a person calling later on will take, say for instance 6 seconds. The device is thus put into system condition F3, where a low frequency marking was put onto the announcement tape, see table line F3, according to which control variables MTX, MAX, HF, NF, R6 are on the higher level 1.

By releasing the start button ($\overline{ST}$) the device again is put into system condition F2, so that the second part of the announcement text (final cancellation) can be recorded onto the announcement tape. After the speaking is finished the start button is again pushed (ST) for approximately 2 seconds, which in the system condition F3 introduces a second marking on the announcement tape. If necessary this procedure may be repeated.

After recording the second, that is to say the last marking, the start button has to be released, until due to the closing of the end of the tape contact the input variable BEK1 is produced and the device moves into system condition F4. According to line F4 of the table the control variable MTX is now on the higher level 1, but no longer the control variable MAX, so that the announcement tape is rewound, until the system condition F1 by delivering the input variables BAK1 of the tape beginning contact is reached again and the yellow signal lamp 14 (FIG. 1) lights up, or that the control variable LW exists.

According to line F4 of the table, in this system condition are to be found also control variable ZL2 on the higher level 1, so that the timing switch 66 (FIG. 8) is relased. If before running out of the fixed time lag, of for instance 2 minutes of the timing switch 66, the device reaches system condition F1, this is of no consequence, because of the latter condition ZL=0. If the system condition F1 is not reached within 2 minutes, in case of tearing of the tape for instance, the input variable ZL is generated, which brings the device from condition F14 into condition F13, which is a blocking position, in which the device does not function until the error has been corrected.

play-back of the announcement text

The action control switch 3 is now brought into position 6 (FIG. 1). When the yellow signal lamp 14 lights up, system condition F1, start button 10 is pushed which closes contact 62 in FIG. 7, and input variable STWT delivers a message. The device thus reaches system condition F5, in which the whole supply of announcement tape of approximately 60 second duration is played back, see line F5 of the table, whereby the control variables MTX, MAX and R7 obtain the higher level 1, that is to say the input of the endstage 36 becomes unlocked. After closing the tape end contact, through which is generated the input variable BEK1, the device reaches system condition F4 and then output condition F1 or in any case blocking condition F13, as described before.

Playback of the recorded messages

Action control switch 3 is put into position 5 (FIG. 1 and 7). When the yellow signal lamp 14 lights up, system condition F1, the start button 10 is pushed, closing contact 62 in FIG. 7, whereby the input variable STIW delivers a message. The device reaches system condition F7, in which the recording tape is replayed, see line F7 on the table, whereafter control variables MTP, MAP, R7, R8 have the higher level 1. Signal R7 unlocks endstage 36. The replay can be interrupted by activating stop button 11 (STO) or, if the complete tape supply has been replayed, by means of the tape end contact (BAK2). The device thus reaches system condition F1.

Rewinding of the storage tape is not performed automatically. Rewinding button 12 in FIG. 1 has to be pushed to this effect. By doing this, input variable RT1W produces a message and at the same time input variable LT (erasing button) does not produce a message, so that the device reaches system condition F6, wherein the voice tape is rewound, see line F6 on the table; thus only control variable MTP has the higher level 1. The rewind can be interrupted by activating stop button 11 (STO) or by completely rewinding the storage tape by means of the tape beginning contact (BAK2). The device thus reaches system condition F1.

If the rewind button 12 and the erasing button 13 are pushed at the same time (LT . RTTW), in system condition F14 when rewinding the tape the contents are erased simultaneously, see line F14 on the table, whereby the control variables MTP, HF, FFR and R8 have the higher level 1. In this case there also follows an interruption of the rewinding operation when pushing stop button 11 (STO) or by beginning of the tape contact (BAK2). The signal FFR sets RS-flipflop of the digital control system on FIG. 9 back, so that the control variable LR falls onto 0 and the red lamp 15 turns off.

Telephone operation

Action control switch 3 is set into position 4 (FIG. 1), whereby the green signal lamp 16 lights, (FIG. 7). When the yellow signal lamp 14 is lighted, system condition F1, and both cassettes are set in place, and a call comes in and neither the announcement tape nor the recording tape are in the end position, that is to say that the input variable ASTE . $\overline{BEK1}$ . $\overline{BEK2}$ delivers a message, the device is in system condition F8, in which the announcement text is transmitted to the telephone line, see line F8 on the table, whereby the control variables MTX, MAX, ZL2, R1R2, R3 and R7 have the higher level 1. When obtaining the first sound marking on the announcement tape, the input variable MS delivers a control signal. This brings the device into system condition F9, in which during the time of marking, that is to say when recording the marking, the start button had been pushed (i.e. 6 seconds), an incoming voice signal is expected and the recording can start, see line F9 on the table, according to which the control variables MTX, MAX, R1R2 have a higher level. If there is no marking on the announcement tape, then the whole announcement tape runs through until the end contact, which delivers the input variable BEK1, so that the device passes from condition F8 to condition F4, in which according to the procedure already described the announcement tape is rewound, so that the device adopts again system condition F1.

In the event of a tape tearing, after say 2 minutes, there is input variable ZL, which is generated through time switch 66, which during condition F8 obtained control variable ZL2, so that the device reaches condition F13, the blocking position.

If in system condition F9 during the time interval of the existence of the marking a voice signal occurs, then the input variable SP (output signal of the voice switch 46 in FIG. 2) releases a message, so that the device reaches system condition F10, see line F10 on the table, whereby the control variable MAP, HF, ZL1, R1R2, R4, R6, R7, R8 and FFS have the higher level 1. In this manner the incoming message is recorded on the recording tape, whereby signal FFS sets RS-flipflop on FIG. 9, so that the red signal lamp 15 is lighted.

The duration of the recording is limited through one of the following criteria, see FIG. 10:
  A. end of incoming message: approximately 6 seconds later the input variable SP drops;
  B. adjustable time limit of timing switch 65: After 30 seconds up to 2 minutes this timing switch delivers the input variable ZL;
  C. end of storage tape: Input variable BEK2 starts;
  D. pushing stop button 11: Input variable STO starts.
This interruption possibility permits to interrupt the storage of undesirable messages which have already been monitored. Thus the monitoring possibility is made possible by the fact that in system condition F10 control variable R7 unlocks power stage 36.

Due to the effect of one of the above mentioned control signals the device reaches system condition F11, where the second portion of the announcement text or final cancellation is transmitted onto the telephone line, see line F11 on the table, whereby the control variables MTX, MAX, ZL2, R1R2, R3, R7 have the higher level.

When reaching the second marking on the announcement tape (input variable MS) or when reaching the tape end contact on the announcement tape (input variable BEK1) or by pushing the stop button, input variable STO, the device passes onto system condition F4 and after rewinding the announcement tape it reaches system condition F1, in which the yellow signal lamp 14 is lighted again and the device is ready for a new call. Furthermore in condition F4 the telephone loop gets separated again. If in condition F11 the announcement tape is torn, the time limit of the time switch 66 is exceeded causing the input variable ZL to bring about system condition F13 (blocking position).

If in system condition F9 during the marking, no message comes in, that is to say that the output variable SP does not deliver any message, the device at the end of the marking goes directly into system condition F11, during which the final cancellation is transmitted ($\overline{MS}$).

It should also be observed, that in system condition F4 the input tape is rewound and condition F1 of ready to operate is reached only when the announcement tape is not in the initial position. If the recording tape is in the end position, the input variable BEK2 puts the device into condition F13, that is to say into the blocking position. After eliminating the error, by pushing the stop button 11 (input variable STO), the device can be put into condition F4 again, from which after rewinding the announcement tape it goes into condition F1. When switching on the device a reset signal R can be obtained, by having first the device in condition F4, and it only reaches condition F1 of ready to operate with the lighting up of yellow signal lamp 14, when the announcement tape is rewound and the recording tape has not arrived to its end.

The described device can also be operated so that it automatically only answers calls, and does not store incoming messages. To obtain this function, there are the following two possibilities:
  A. When recording the announcement text, which naturally has to confrom with the operating manner of the device, and particularly should not include any request to speak, the recording of a marking signal at the end of the announcement text is eliminated, whereby the announcement tape is allowed to run to its end, see FIG. 10 the transition from condition F2 to condition F4, caused by the occurrence of signal BEK1 (end of the announcement tape).
  If in position 4 of action control switch 3 (telephone line) a call comes in, the device as already described, passes from system condition F1 of ready to operate into system condition F8, in which the announcement text is transmitted onto the telephone line. At the end of the announcement text the marking signal MS does not appear in this case, so that the transition into system condition F9, in which an incoming voice signal is expected, does not occur. Now the complete announcement tape runs through, until the signal BEK1 generated by the tape end contact occurs, which allows the transition of the device into system condition F4, wherein the telephone loop is separated and the announcement tape is rewound, so that in condition F1 another call can be answered.

B. When recording the adapted announcement text onto the announcement tape at the end of the text in short intervals two short marking impulses are recorded, for instance two impulses each approximately one second at an interval of also approximately one second. The purpose of the double marking impulses is to effect immediate reverse movement of the announcement tape after termination of the announcement text.

Once in the operating position "telephone" of the device a call has come in the device is again in system condition F8, wherein the announcement text is sent onto the telephone line. At the end of the announcement text appears the first marking impulse MS, which puts the device into system condition F9. Since the condition F9 is only kept as long as the marking signal MS is on, the device after only a short time, i.e. after one second, at the end of the first marking impulse, adopts system condition F11, since most probably during this short time interval no other incoming voice signal will be received, even if the calling person would start speaking without having been asked to do so. In condition F11 one second later the second marking impulse MS is transmitted, which puts the device into system condition F4, in which the telephone loop is separated, the announcement tape is rewound and the ready to use condition is restored (system condition F1).

The possibility described under (B) of operating the device as only call answering has, compared with the possibilities described in (A), the advantage that after transmission of the announcement text the ready to operate condition is restored faster, because it is not necessary to wait for the complete runoff of the announcement tape.

We claim:

1. Automatic telephone answering and announcement device comprising in operative electrical connection:
   a. a first sound recorder (AW1) for recording, reproducing and answering oral text;
   b. a second sound recorder (AW2) for recording and playing back incoming messages;
   c. action control switch means (3); and
   d. additional selectivity switches (10, 11, 12, 13) for selecting specific functions;
   e. a switching system (33, 40, 52, 54, 56, 65, 66);
   f. amplifying system;
   g. a control system for independent control of the work cycle of the device in its different functions, said control system (3) including third recording means to apply at least a marking signal on the first sound recorder (AW1) and for the playback thereof, whereby to switch the device from playing back the call answering text to recording the incoming message and to correct in event of a premature ending of the playback of the call answering text;
   h. call detector means (27);
   i. voice detector means (46) for incoming messages;
   j. marking detector means (38) for detecting marking signals on the first recorder;
   said action control means (3) and the additional switches (10, 11, 12, 13) as well as the call detector (27), the voice detector (46) and the marking detector (38) being interconnected to deliver binary message signals (ST1W), STWT, STAT, ASTE, ST, STO, RT, LT, AS, SP, MS);
   k. a digital control means (67, 68, 69) comprising an integrated circuit, the inputs (67) of which are in connection with said action control switch (3), the additional switches (10, 11, 13) and the outputs of said respective detectors (27, 46 and 38) and the output of the digital control means (68) being connected with control inputs of an electrical switching means (33, 40, 52, 54, 56, 65, 66), whereby the digital control means, depending on its internal condition and that of the binary message signal, generates binary control signals (MTX, MTP, MAX, MAP, HF, NF, ZL1, ZL2, R1 to R8) for said electrical switching means requiring control;
   l. driving means for the respective recorders; and
   m. a source of electrical power.

2. The device according to claim 1, in which the first and second sound recorders (AW1 and AW2) include magnetic tapes, wound into cassettes.

3. The device according to claim 1, in which the said additional switches (10, 12, 13, 14) comprise a starting switch (10), a stop switch (11), a return switch (12), for the second magnetic sound recorder and an erasing switch (13) for the respective magnetic sound recorders, whereby one of the terminals of each switch is connected through a resistance (60) with a first, fixed potential, i.e. a positive potential, and the second terminal of each switch is connected with a second, fixed potential, i.e. the ground potential.

4. The device according to claim 2, in which the additional switches also include the tape beginning contacts (BAK1, BAK2) and tape end contacts (BEK1, BEK2) which can be activated by means of the two magnetic tapes.

5. The device according to claim 3, in which the additional switches also include the tape beginning contacts (BAK1, BAK2) and tape end contacts (BEK1, BEK2) which can be activated by means of the two magnetic tapes.

6. The device according to claim 3 in which the action control switch (3) has 4 operating positions (4, 5, 6, 7), the first position (4) serving for activation of the device on a telephone line for playing back of the announcement text from the first magnetic sound recorder and recording the incoming messages on the second magnetic sound recorder, the second position (5) for internal play-back of the message recorded on the second magnetic sound recorder, the third position (6) for recording the announcement text and at least one marking signal on the first magnetic sound recorder and the fourth position (7) for internal playback of the recorded announcement text, whereby a first movable contact element of the action control switch is connected with the start button (10) and a second movable contact element with the output of the call detector (27), a fixed contact of the first position (4) assigned to the first movable contact element being connected with a first signal lamp (16) indicating the first operating position, fixed contacts of the remaining position (5, 6, 7) allocated to the first contact element and the fixed contact of the first position (4) allocated to the second movable contact element being connected with inputs (67) of the digital control system (67, 68, 69).

7. The device according to claim 6, in which additional signal lamps (14, 15) are adapted to indicate that the device is ready to operate and to indicate that at least one incoming message has been recorded, whereby each signal lamp is connected to a switch transistor (51), the control electrodes of which are connected with one output (68) of the digital control system (67, 68, 69) emitting a corresponding control signal (LW, LR).

8. The device according to claim 1, in which each recorder switch connects to an electromotor (M) for the advancing and rewind of the said first and/or second sound recorder and an electromechanical switch-over element (52) connected to the electromotor (M) for selectively switching on advance or rewind, each motor and each switch-over element being further connected in series to a switch transistor (58, 54), the control electrodes of which are connected with an output (68) of the digital control system (67, 68, 69) which emits a corresponding binary control signal (MTX, MTP, MAX, MAP).

9. The device according to claim 1, in which the call detector (27) contains a differentiating circuit, a rectifying circuit connected to it and a subsequent integrating circuit, preferably with an adjustable timing constant to obtain impulses which are independent of the amplitude of the call signal.

10. The device according to claim 1, in which the voice detector (46) is provided on its input with a high-pass filter having a cutoff frequency of approximately 600 Hz, and a differentiating switch for detecting fluctuating amplitudes of an input signal, a storage condensor which becomes charged and discharged with a sine-shaped input signal so that the voice detector for sine-shaped input signals does not deliver any output signal, and an RC time element, to obtain a determined time delay and thus a stopping of the output signal of the voice detector during a speaking pause.

11. The device according to claim 1, in which the marking generator (33) generates the recording marking signal and selectively amplifies the recorded marking signals, said marking generator (33) having an active filter switch with a feedback circuit, which may be controlled through a binary control signal (NF) of the digital control system (67, 68, 69), in such a manner that when the control signal (NF) exists, the active filter switch with its proper frequency swings from 180 to 200 Hz, but in the event of non existence of the control signal (NF) it forms a selective amplifier for said frequency, the input of said marking detector (38) being connected to the amplifier output of said marking generator (33).

12. The device according to claim 1 including relay contacts (K1, K2, K3, K4) for connecting a telephone line (A,B) and/or for switching the connection over to the telephone line from the input to the output of a variable-gain amplifier (31) and vice versa as well as for switching the input of the variable-gain amplifier (31) from the connection with the telephone line to the output of a preamplifier (32), to the input of which a microphone signal of a signal reproduced by the first or the second magnetic sound recorder is conducted, and for the output of a marking generator (33) in order to generate marking signals, relay contact (K1, K2, K3, K4) have been provided, and connected relays (52) are each one connected to a transistor (54), the control electrodes of which are connected with an output (68) of the digital control system (67, 68, 69).

13. Device according to claim 12, in which additional relay contacts (K5, K6, K8) are provided for switching the input of the preamplifier (32) from a line for a microphone (MIC) to lines for play-back and sound recording heads (AW1, AW2) for the first and second magnetic sound recorder, switching said sound heads (AW1, AW2) from the input of the preamplifier (32) to the output of the variable-gain amplifier (31) as well as for the selective setting of the sound head (AW1 and AW2) and of an erasing head (LK1 or LK2) for the first or for the second magnetic sound recorder, whereby the relays (52) belonging to the relay contacts are each connected to a transistor (54), the control electrodes of which are connected with output (68) of the digital control system emitting a corresponding binary control signal (R5, R6, R8).

14. The device according to claim 13, in which a high frequency generator (4) is provided for generating an erasing signal for the erasing heads (LK1, LK2) and for the magnetizing of the sound heads (AW1, AW2), said high frequency generator being controlled by a binary control signal (HF) of the digital control system (67, 68, 69), whereby the output of the generator (40) is connected to relay contact (K8) for the selective setting of the erasing heads (LK1, LK2), and through a voltage divider (42) is connected to the output of the variable-gain amplifer (31).

15. The device according to claim 1, in which at least one timing switch (65, 66) is provided for a premature termination of the recording of the incoming message and/or for blocking the device in event of malfunction of the first sound recorder, whereby the input of the timing switch is connected to an output (68) of the digital control system (67, 68, 69) and the output of the timing switch is connected to the input (67) of the digital control system.

16. The device according to claim 6, in which for playing back a recorded message as well as the call answering text a power stage (36) with a loudspeaker (37) is provided, which may be blocked or unblocked by means of a binary control signal (R7) of the digital control system (67, 68, 69).

17. In a device connected to terminals for a telephone exchange line for the automatic answering of telephone calls having a first magnetic sound recorder for recording and reproducing an answering text and a drive mechanism for said first magnetic sound recorder; a storage device containing a second magnetic sound recorder for recording and reproducing of arriving messages and a drive mechanism for said second magnetic sound recorder and an electric circuit and amplifying means adapted to be combined selectively by switching means including an operation control switch means and additional selectively operable switches for selecting specific functions, said electric circuit and amplifying means including a plurality of control means for control of the cyclic functions of the device in different modes of operations, said control means comprising means for recording at least one control signal on said first sound recorder and for reproducing said recorded control signal for the purpose of switching the device from reproduction of the answering text to recording the incoming call, the improvement comprising:

a call detector means connected to said terminals for the exchange line, voice detector means for incoming messages connected to said terminals for the exchange line, marking detector means connected to said first magnetic sound recorder for detecting said control signals on said first sound recorder, said operation control switch, the additional switches, the call detector means, the voice detector means and the marking detector means including output terminals for delivering binary control signals corresponding to the presence and absence of a respective event, a digital control means in the form of a periodically clocked integrated circuit means having a plurality of input terminals each connected with a different one of the outputs of said operation control switch, additional switches, call detector means, voice detector means and marking detector means, and having a plurality of output terminals each connected with an input of a different one of said plurality of control means for control of the cyclic functions of the device, whereby the digital control means, depending on its internal state and that of the binary control signals at its input terminals, generates binary control signals for said plurality of control means for control of the cyclic functions of the device.

\* \* \* \* \*

UNITED STATES PATENT AND TRADEMARK OFFICE
CERTIFICATE OF CORRECTION

PATENT NO. : 3,937,893

DATED : February 10, 1976

INVENTOR(S) : Willy Muller; Markus Moser, Egg

It is certified that error appears in the above-identified patent and that said Letters Patent is hereby corrected as shown below:

<u>In Claim 1,</u>

Line 59: Delete "(3)".
Line 62: Substitute -- thereby -- for "whereby".
Line 64: Substitute -- react -- for "correct".

Signed and Sealed this

Seventeenth Day of May, 1988

Attest:

DONALD J. QUIGG

*Attesting Officer*   *Commissioner of Patents and Trademarks*